United States Patent [19]

Lipsey et al.

[11] Patent Number: 4,488,250
[45] Date of Patent: Dec. 11, 1984

[54] HAND-HELD CALCULATOR FOR PERFORMING CALCULATIONS IN FEET, INCHES AND FRACTIONS

[76] Inventors: William S. Lipsey, P.O. Box 3203; Henry B. Teague, P.O. Box 4684, both of Aspen, Colo. 81611

[21] Appl. No.: 394,515

[22] Filed: Jul. 2, 1982

[51] Int. Cl.³ ............................ G06F 3/02; G06F 3/14
[52] U.S. Cl. .................................... 364/709; 364/710
[58] Field of Search ............... 364/709, 710, 561, 562, 364/563

[56] References Cited

U.S. PATENT DOCUMENTS

| | | | |
|---|---|---|---|
| 3,819,921 | 6/1974 | Kilby et al. | 364/712 |
| 3,858,033 | 12/1974 | Esch | 377/50 |
| 3,872,288 | 3/1975 | Sampey | 364/561 |
| 3,878,380 | 4/1975 | Tsuiki | 364/710 |
| 3,895,356 | 7/1975 | Kraus | 364/900 |
| 3,934,233 | 1/1976 | Fisher | 365/203 |
| 3,973,113 | 8/1976 | Goldsamt | 364/709 |
| 3,979,057 | 9/1976 | Katz | 364/706 |
| 3,979,058 | 9/1976 | Katz | 364/706 |
| 3,989,939 | 11/1976 | Raymond, Jr. | 364/712 |
| 4,001,569 | 1/1977 | Dickinson | 364/715 |
| 4,005,293 | 1/1977 | Boulanger | 200/5 A |
| 4,051,605 | 10/1977 | Toal | 434/204 |
| 4,081,859 | 3/1978 | Goldsamt et al. | 364/709 |
| 4,100,603 | 7/1978 | Boyd | 364/771 |
| 4,158,229 | 6/1979 | Woo, Jr. | 364/562 |
| 4,195,348 | 3/1980 | Kakutani | 364/562 |
| 4,213,035 | 7/1980 | Washizuka | 364/562 |
| 4,249,744 | 2/1981 | Bromley | 273/85 G |

OTHER PUBLICATIONS

Addometer Literature from Addometer Company.
Burroughs Literature for its Model C6451.

Primary Examiner—David H. Malzahn
Attorney, Agent, or Firm—Robert C. Dorr

[57] ABSTRACT

A portable hand-held electronic calculator for performing feet, inch, and fraction calculations and for displaying numerical results in feet, inches, and fractions of inches. Values for feet, inches, and fractions of inches can be entered directly without first changing the numbers into a decimal format and complex calculations, such as multiplication, division, addition, subtraction, squares and square roots can be performed directly. A specialized sequential display allows the user to manually enter numeral data in a particular sequence related specifically to the sequence that feet, inches, and fractions are conventionally written and spoken in the construction industry.

9 Claims, 16 Drawing Figures

HAND-HELD CALCULATOR FOR PERFORMING CALCULATIONS IN FEET, INCHES AND FRACTIONS

BACKGROUND OF THE INVENTION

A. Field of the Invention

This invention relates to hand-held calculators and in particular to hand-held calculators which perform numeric calculations in feet, inches and fractions of inches and which display the results also in feet, inches, and fractions of inches without the necessity of first changing the numbers into a decimal format.

B. Background Art

Portable hand-held electronic calculators are well known and readily available in the marketplace. Typically, these calculators have a housing containing a display, a keyboard for entering numerical values, a keyboard for entering functions such as arithmetic operations, and a microprocessor or the like contained therein for performing a number of predetermined computations based upon which keys in the numerical and functional keyboard are pressed.

A portable hand-held electronic calculator is needed for performing calculations in feet, inches, and fractions of an inch, and for displaying the results in feet, inches and fractions in a conventional and recognizable format. It is adapted to perform in a manner that is particularly useful to the home handyman, the construction industry and the many trades and professions where feet, inches, and fractions are the standard units of measurement. Complex, confusing, and error ridden calculations involving feet, inches, and fractions of an inch, such as multiplication, division, addition, subtraction, squares and square roots, can be performed directly without first converting the numbers into a decimal format. A specialized display is further desired which allows the user to keep track of his place while making feet, inches and fractions entries. Such a display should prompt the user to manually enter numerical data in a particular sequence related specifically to the way that feet, inches, and fractions are conventionally written and spoken in the construction industry. Accordingly such a calculator may be used both in the home, office and field to perform quickly and efficiently complex calculations in feet, inches, and fractions that are now being performed longhand, thus saving time, reducing error, and reducing building construction costs.

The inventors prior to the filing of this invention, effectuated a patentability search to ascertain the state of the prior art. The results of this search are as follows:

| INVENTOR | SERIAL NO. | ISSUE DATE |
|---|---|---|
| Kilby | 3,819,921 | June 25, 1974 |
| Sampey | 3,872,288 | March 18, 1975 |
| Kraus | 3,895,356 | July 15, 1975 |
| Fisher et al | 3,934,233 | Jan. 20, 1976 |
| Esch | 3,858,033 | Dec. 31, 1974 |
| Goldsamt | 3,973,113 | August 3, 1976 |
| Katz et al | 3,979,057 | Sept. 7, 1976 |
| Katz et al | 3,979,058 | Sept. 7, 1976 |
| Raymond, Jr. | 3,989,939 | Nov. 2, 1976 |
| Dickinson et al | 4,001,569 | Jan. 4, 1977 |
| Boulanger | 4,005,293 | Jan. 25, 1977 |
| Woo, Jr. et al | 4,158,229 | June 12, 1979 |
| Kakutani | 4,195,348 | March 25, 1980 |
| Washizuka | 4,213,035 | July 15, 1980 |
| Bromley | 4,249,744 | Feb. 10, 1981 |

-continued

| INVENTOR | SERIAL NO. | ISSUE DATE |
|---|---|---|
| Toal et al | 4,051,605 | October 4, 1977 |

The 1977 patent issued to Dickinson et al (U.S. Pat. No. 4,001,569) sets forth a battery powered hand-held calculator which, among other functions, provides conversion programming routines from one unit of measurement to other units of measurement. Conversion factors are built in so that the user of the hand-held calculator does not have to memorize them.

The 1980 patent issued to Kakutni (U.S. Pat. No. 4,195,348) and the 1980 patent issued to Washizuka et al (U.S. Pat. No. 4,213,035) both relate to an electronic digital scale and calculator. Both approaches utilize a conventional tape measure in connection with electronic circuitry, a keyboard, and a display. In the Kakutni approach, various programs are built in such as conversion programs for conversion to inches or to feet but not to feet and inches! The Washizuka patent includes a program to use the calculator both as a combined protractor and calculator.

The 1979 patent issued to Woo, Jr. et al (U.S. Pat. No. 4,158,229) relates to an electronic roll adding a keyboard, alpha numeric display, and an electronic scale.

The 1975 patent issued to Kraus (U.S. Pat. No. 3,895,356) also relates to an electronic scale or gauging system for performing measurement functions and a programmable calculator with an associated display. A number of programs are built into the side for performing different types of functions.

Finally, the patents issued to Sampey (U.S. Pat. No. 3,872,288) and to Esch (U.S. Pat. No. 3,858,033) both relate to electronic readout apparatuses for distance measuring instruments.

The Katz patent (U.S. Pat. No. 3,979,058) sets forth a prompting system for guiding the operator of the calculator through programming routines by directly indicating when data should be entered and what type of data should be entered. Another Katz patent (U.S. Pat. No. 3,979,057) relates to an electronic navigational computer involving a number of program selector keys which can be selected to achieve the desired result. These selector keys relate to special navigational parameters.

The Kilby et al patent (U.S. Pat. No. 3,819,921) discloses a miniature electronic calculator utilizing an integrated semi-conductor circuit array located in one plane for performing the arithmetic calculations and for generating the control signals.

The Raymond, Jr. patent (U.S. Pat. No. 3,989,939) sets forth an electronic calculator which is ligit oriented and which utilizes both a read only memory for program storage and a random access memory for data storage.

The Boulenger patent (U.S. Pat. No. 4,005,293) relates to a push button keyboard switch assembly for inputting into a hand-held calculator.

The Bromly patent (U.S. Pat. No. 4,249,744) discloses a hand-held electronic device for simulating a two player electronic sports action game.

The Fisher et al patent (U.S. Pat. No. 3,934,233) sets forth a read only memory technique for use in electronic hand-held calculators.

Finally, the Goldsamt patent (U.S. Pat. No. 3,973,113) discusses an electronic calculator for handling feet, inch and fraction numerics. The Goldsamt approach utilizes a separate set of keys for inputting fractional values. The disclosed keys are as follows: 1/8, 1/4, 3/8, 1/2, 5/8, 3/4 and 7/8.

For fractions of a higher resolution an additional key on separate keyboards would have to be provided for each key.

Of all the prior art "patented" approaches set forth above, only the Goldsamt patent relates to a calculator in the same field as the present invention. Goldsamt performs his functions through the use of a "primary core" which corresponds to a conventional functional numerical keyboard. Additionally, a separate "inch core" containing the numbers 1 through 12 is provided. Finally, a "fraction core" setting forth the above listed fractions is provided. Hence, Goldsamt contemplates the use of three separate input keyboards: one for entering feet, one for entering inches, and one for entering fractions of an inch.

The inventors are also aware of a product trademarked "ADDOMETER" and manufactured by the Addometer Company, 14901 Evans, Dolton, Ill. 60419. This product uses a "FT" key for displaying entered numerics as feet, an "IN" key for displaying entered numerics as inches, and a "FR" key for displaying entered numerics as fractions.

SUMMARY OF THE INVENTION

A portable hand-held electronic calculator for feet, inch, and fraction calculations is set forth. The calculator uses the conventional housing having a display, numerical and functional keys, and an internal computer for performing a number of predetermined computations and calculations based upon the input status of the keys.

A field set of keys of the present invention is provided having a feet input key, an inch input key and a plurality of fraction input keys of the preferred series: x/2, x/4, x/8, x/16, ..., $x/2^n$, where n is an integer and where x is preselected from the numerical keyboard. In the operation, x/64 is the practical limit. Further, other fraction input keys such as x/3, x/6, etc. could be utilized in addition to or in place of the x/2, x/4 etc. series A mode input key of the present invention is also provided in the function keys for converting numerics in the calculator from a feet-inch-fraction (FIF) mode of operation to a decimal-inch (DI) mode of operation. The display of the present invention is capable of indicating each of the following:

(x) FT, (y) INCHES, AND $(z)/2^{N''}$

Where the values of x, y or z are selected from the numerical keys and the value of $2^n$ is selected from one of the fraction input keys in the field keys set forth above.

The computer in the calculator of the present invention is modified to be receptive of a number from the numerical keys and then responds to the activation of one of the input keys in the field keys for displaying the selected numbers in feet, inches, and/or fractions of inches in the display according to the above indications. Furthermore, the computer is capable of performing computations in feet, inches and fractions of inches.

GENERAL DESCRIPTION

Figure 1:
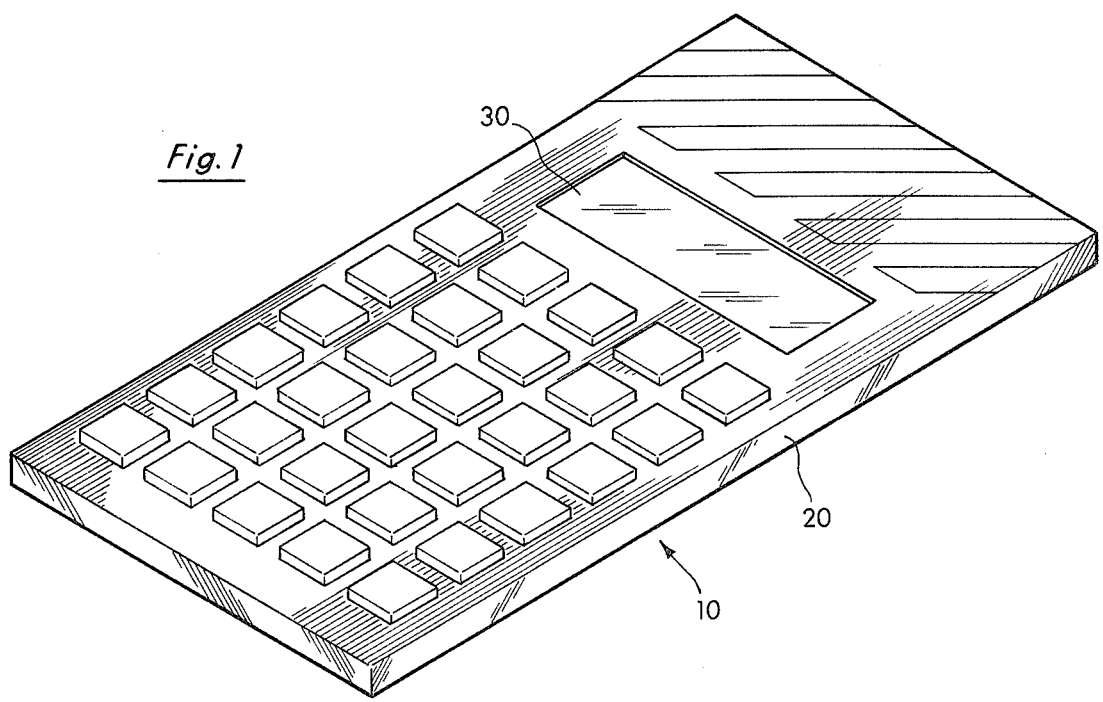
FIG. 1 sets forth a perspective view of the hand-held electronic calculator of the present invention, FIG. 2 sets forth a top planar view of the hand-held calculator, in a first embodiment, as shown in FIG. 1, FIG. 3 sets forth a block diagram of the components contained in the hand-held calculator of the present invention, FIG. 4 sets forth the initialization subroutine of the present invention, FIG. 5 sets forth the keyboard scan sub-routine of the present invention, FIG. 6 sets forth the numeric sub-routine of the present invention, FIG. 7 sets forth the function sub-routine of the present invention, FIG. 8 sets forth the continuation of the function sub-routine of the present invention, FIG. 9 sets forth the equals sub-routine of the present invention, FIG. 10 sets forth the arithmetic sub-routine of the present invention, FIG. 11 sets forth the field sub-routine of the present invention, FIG. 12 sets forth the hand-held calculator of the present invention as shown in FIG. 1 in a second embodiment.
Figure 2:
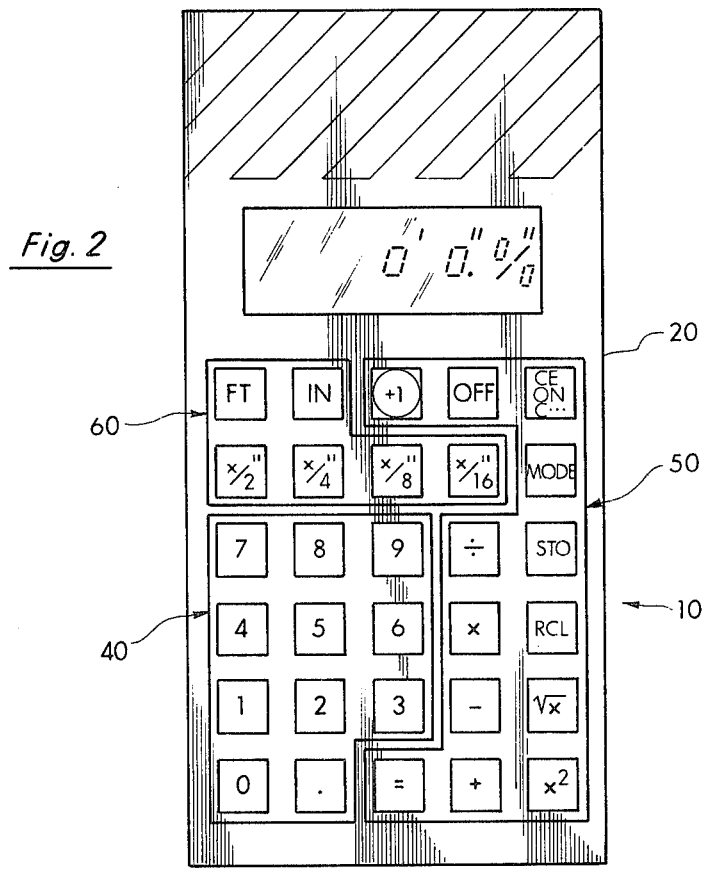

In FIGS. 1 and 2, the portable hand-held calculator 10 of the present invention is shown contained in a housing 20 containing a display 30, numerical keys 40, functional keys 50, and field keys 60 of the present invention.

The numerical keys 40, in the preferred embodiment, contain the Arabic numerals: 0, 1, 2, 3, 4, 5, 6, 7, 8, and 9 with each numeral having a separate key input. The functional keys 50 contain, in the preferred embodiment, the following functions: =, −, +, ×, ÷, √x, $x^2$, memory storage (STO) and memory recall (RCL), numerical counter (+1), OFF, ON, clear entry (CE) and clear (C). The numerical keys 40 and the functional keys 50 are conventional to portable hand-held calculators.

The field keys 60 of the present invention include the following key inputs: feet (FT), inches (IN), x/2, x/4, x/8, and x/16. Through use of the field keys 60 of the present invention, the calculator 10 of the present invention is capable of performing and determining calculations in feet, inches and fractions of inches.

For example, assume it is desired to enter in the value of 13 FT 3 and 3/16 IN into the calculator 10 of the present invention. The following steps would take place:

| Press Sequence | Location | Display |
| --- | --- | --- |
| Press ON | Function Keys 50 | 0' 0'' |
| Push Key #1 | Numerical Keys 40 | 1 |
| Push Key #3 | Numerical Keys 40 | 13 |
| Push Key FT | Field Keys 60 | 13' |

-continued

| Press Sequence | Location | Display |
| --- | --- | --- |
| Push Key #3 | Numerical Keys 40 | 3 |
| Push Key IN | Field Keys 60 | 13' 3" |
| Push Key #3 | Numerical Keys 40 | 3 |
| Push Key x/16 | Field Keys 60 | 13' 3 3/16" |

As set forth above, only eight button presses were required to enter the value of 13 FT 3 and 3/16 IN. It is important to note that the entry of the above value into the calculator of the present invention follows the same sequence as the value is commonly spoken. Furthermore, as the value is entered, the display shows the sequence step so that if the user is interrupted, as the value is being manually entered, the user can return and continue the sequence.

Once a value has been inserted, any of the common arithmetic functions can be generated. For example, assume it is desired to add 13/16 IN to the above value. The following sequence of events would take place:

| Sequence | Location | Display |
| --- | --- | --- |
| Push + Key | Functional Keys 50 | 13' 3 13/16" |
| Push Key #1 | Numerical Keys 40 | 1 |
| Push Key #3 | Numerical Keys 40 | 13 |
| Push Key x/16 | Field Keys 60 | 13/16" |
| Push = Key | Functional Keys 50 | 13' 4" |

Also contained in the field keys 60 of the present invention is a conversion key (MODE) which converts the value found in the display 30 from feet, inches and fractions of inches (FIF) to decimal inches (DI) or vice versa. Hence, and pursuant to the prior example, by pushing the MODE key the display would convert 13'-3 3/16" to 159.1875".

It is to be noted that the fraction input keys in the field keys 60 form a plurality of input keys of the series $x/2, x/4, x/8, x/16, \ldots, x/2^n$, where n is an integer and wherein x is pre-selected from numerical keyboard 40. Although the preferred invention stops the series where n equals four, it is to be understood that other embodiments of this invention could include values of n which are greater or lesser than four. Furthermore, a different series such as x/2, x/3, x/4, x/6 (etc.) could be used.

DETAILED DESCRIPTION

A. Calculator Circuitry

Figure 3:
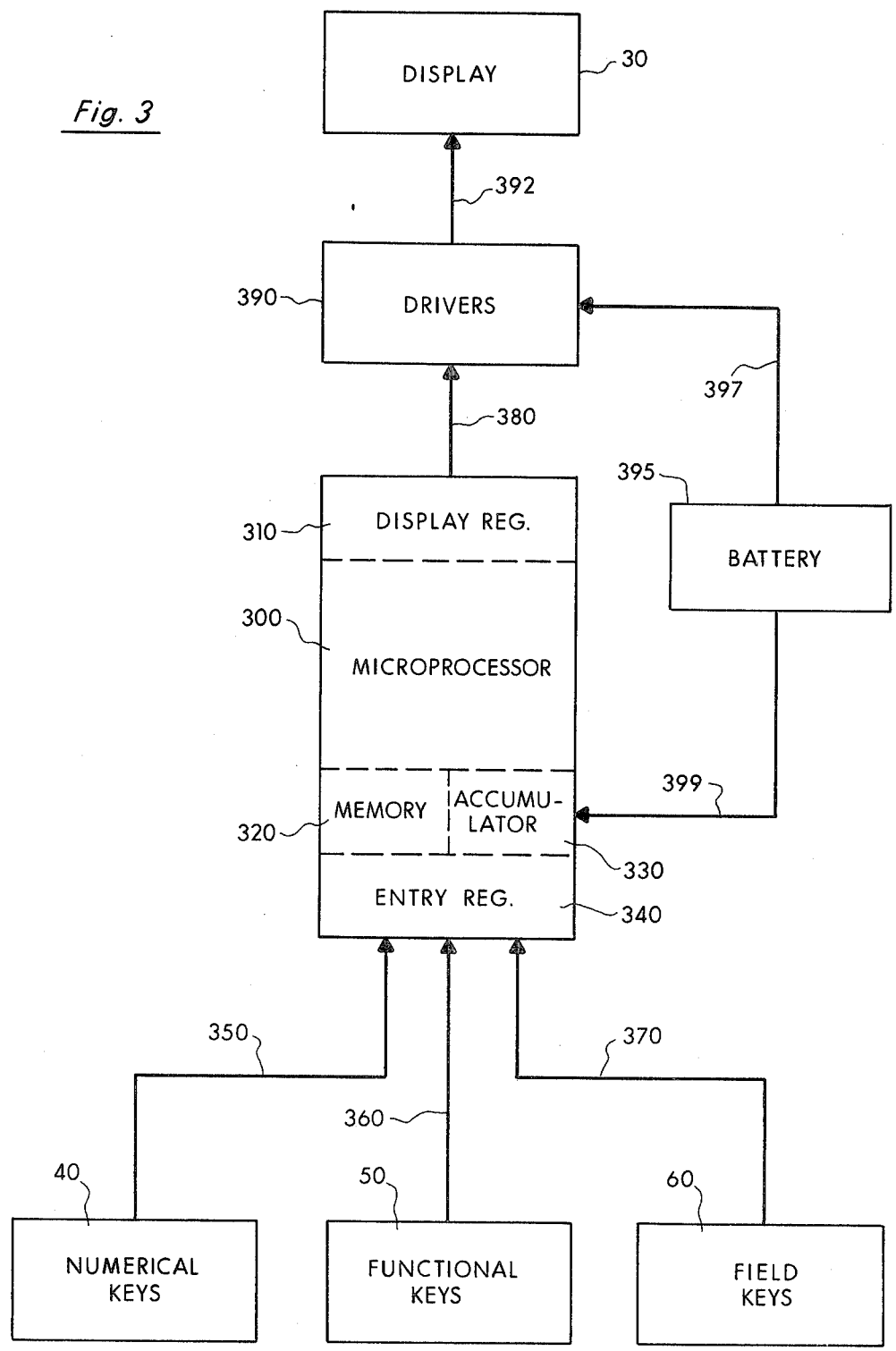

In FIG. 3 the block diagram circuit arrangement for the calculator of the present invention 10 is set forth. The circuit includes a microprocessor 300 containing a display register 310, a memory 320, an accumulator 330, and an entry register 340. The microprocessor 300 is interconnected over bus 350 to the numerical keys 40. The processor 300 is also interconnected over bus 360 to the functional keys 50 and is further interconnected over bus 370 to the field keys 60. The microprocessor 300 communicates over bus 380 with drivers 390. The drivers 390 communicate over bus 392 with the display circuit 30. A battery power supply 395 provides power over lines 397 and 399 to the drivers 390 and to the microprocessor 300 respectively. The microprocessor is preferably a Texas Instrument Company Model TMS 1000C microcomputer using CMOS technology and requiring low power comsumption.

In operation, the microprocessor 300 scans the inputs from the numerical keys 40, the functional keys 50, and the field keys 60 in order to determine the status of each of the keys. If any key has been pushed, the microprocessor moves that information into the entry register 340 and performs computational operations on it which conventionally includes use of the memory 320 and the accumulator 330 contained therein and displays the appropriate information conveyed by the key in the display 30 by selective loading of the display register 310.

The display 30 is of the liquid crystal diode type thereby permitting the calculator 10 of the present invention to be used in direct sunlight. The primary application of the present invention will be in the construction industry and in direct sunlight.

B. Calculator Keys

As set forth in FIG. 2, and in one embodiment, the calculator 10 of the present invention utilizes thirty keys. The various key inputs will now be discussed.

The numerical keys 40 have ten separate key inputs in the form of push-button switches which can be selectively and manually inputted. These key inputs cover the Arabic digits 0 through 9 as shown.

The functional keys 50 include each of the following key inputs:

1. Power On and Clear input key (ON/C/CE): When this key is pressed, the calculator turns on and is ready for entry of information in the feet, inches and fractions (FIF) mode of operation. When pushed once, the number displayed is cleared. When pushed twice, during operation, all entries are cleared except for memory.

2. Power OFF input key (OFF): When this key is pressed, the calculator 10 is turned off.

3. Arithmetic Function input keys (+, −): When these keys are pushed, the calculator 10 of the present invention will perform the indicated arithmetic operation and display the result in the same mode as the entry.

4. Arithmetic Function Input Keys $(x, \div, x^2, \sqrt{x})$: When these keys are pushed, the calculator 10 of the present invention will perform the indicated arithmetic operation and will always display the result in the DI mode whether the entry is made in DI or FIF.

5. Equals input key (=): The pressing of this key completes the arithmetic operation of +, −, x, $\sqrt{x} \div$, and $x^2$.

6. Decimal Point (.): The pressing of this key places the decimal in the display at the desired location.

7. Memory Storage Input Key (STO): Simultaneously clears the memory 320 and stores the value set forth in the display into the memory 320.

8. Retrieve From Memory Input Key (RCL): Displays the contents of the memory in the mode the calculator is in when the RCL is pressed. The content of the memory remains unchanged when the RCL key is pressed thus permitting the memory to also double as a constant function generator. The memory content will be retained through other normal clearing functions.

9. Numerical Counter Input Key (+1): When this key is pressed, the calculator converts to the decimal inch (DI) mode of operation and adds the value of 1 each time the key is pressed.

The FIF keys 60 of the present invention permit the calculator 10 to make entries in the FIF mode (feet, inches and fractions of inches). These keys are non-operational when the calculator is in the DI mode (decimal inch) of operation. Each of these keys will now be described:

1. Feet Input Key (FT): The pressing of this key will enter the value on the display as feet and display it as feet with a foot indicator (').

2. Inches Input Key (IN): The pressing of this key enters the value in the display as inches and displays it as inches with an inch indicator ("). Should the value in the display be twelve or more, the appropriate number of feet and inches will be entered. For example, should the value of 14 appear in the display, the pressing of the inches input key will display 1'-2".

3. Fractional Input Keys (x/2, x/4, x/8, and x/16): When these keys are pressed, the value on the display is entered as the numerator x of the fractional input key pushed. If the numerator is greater than the denominator the calculator automatically displays the appropriate number of feet, inches, and fractions of inches. For example, if the number 33 appears in the display, pressing the x/16 fractional key input will cause the display to register 2 1/16". All fractional inch entries are automatically reduced to the lowest common denominator. For example, 4/8" would be reduced to ½".

C. Calculator Operation

In FIGS. 4 through 11, the operation of the present invention is set forth in the form of sub-routines and in relation to the circuit shown in FIG. 3.

Figure 4:
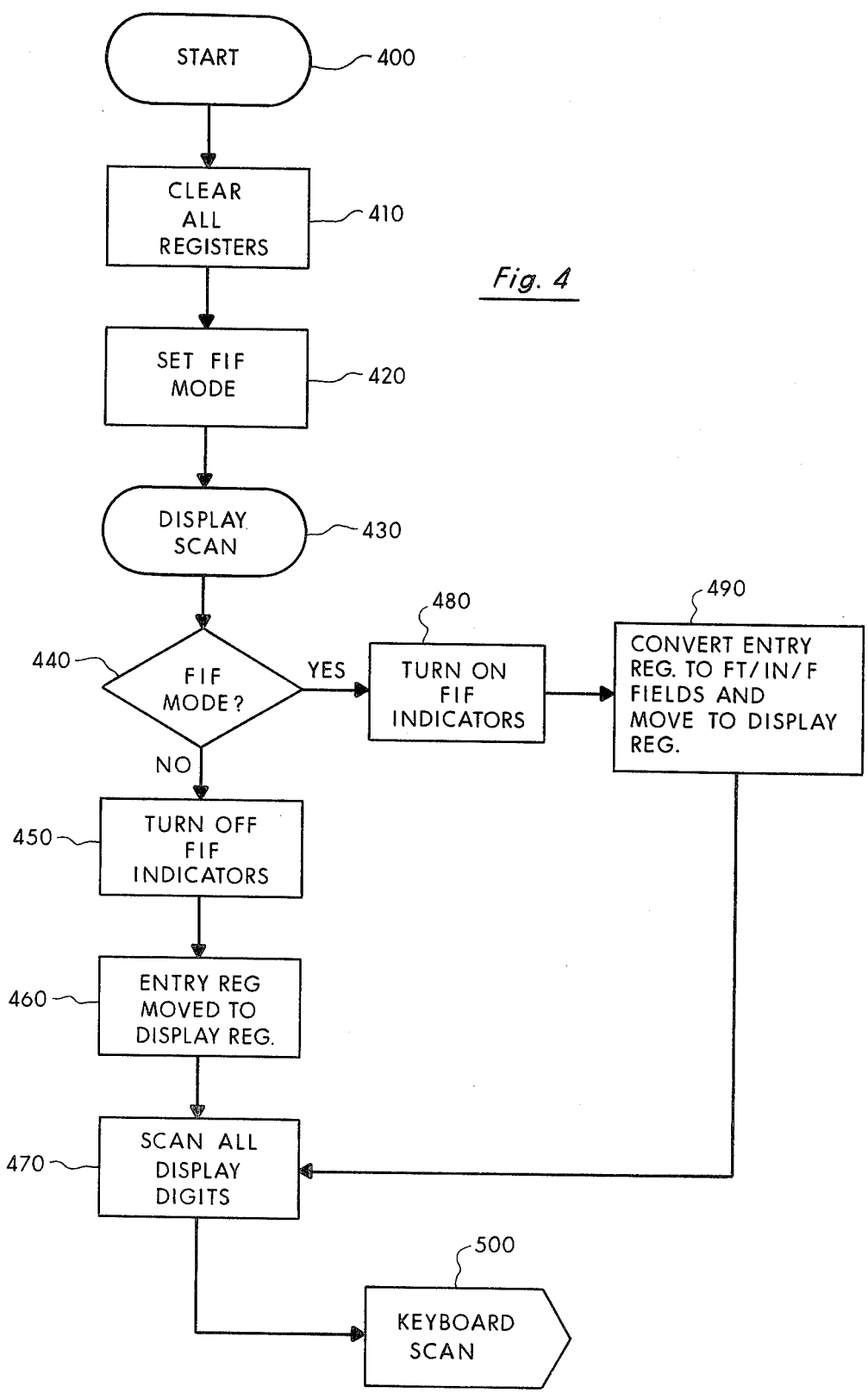

In FIG. 4, the initialization routine 400 of the calculator 10 of the present invention is presented. Pushing of the ON button commences the calculator 10 to start. The battery 395 provides power to the drivers 390 and the microprocessor 30 as shown in FIG. 3. The microprocessor 300 at stage 410 clears all the registers 310, 320, 330, and 340 as well as other internal circuitry. The microprocessor 300 at time 420 is automatically set into the feet, inches and fractions (FIF) mode of operation and the display is set to the values of 0'0" and 0/0" so that the user is aware that the calculator is in the FIF mode. At stage 430, the microprocessor 300 scans the MODE key to see whether or not it has been activated. If it has, the microprocessor 300 must convert its mode of operation into decimal inches (DI) at time 440 and turns off the feet, inches and fractions indicators 450 in the display 30 (as shown in FIG. 2) and it moves the zero values contained in the entry register 340 into the display register 310 so that the display 30 will display a zero value in decimal inches. Again, so that the user will know that the calculator is in the DI mode.

Then the calculator enters a scan of all displays digits stage and then the microprocessor 300 enters the keyboard scan sub-routine 500 which is discussed later in greater detail for FIG. 5.

At the decision making point 440, if the mode key has not been pushed, the calculator remains in the FIF mode of operation and activates the turn on of the FIF indicators in the display 30, at time 480, and then converts the values contained in the entry register to the FIF fields of operation and transfers that information into the display register 310 for display at time 470. At this time, the microprocessor 300 enters the keyboard scan mode of operation 500.

Figure 5:
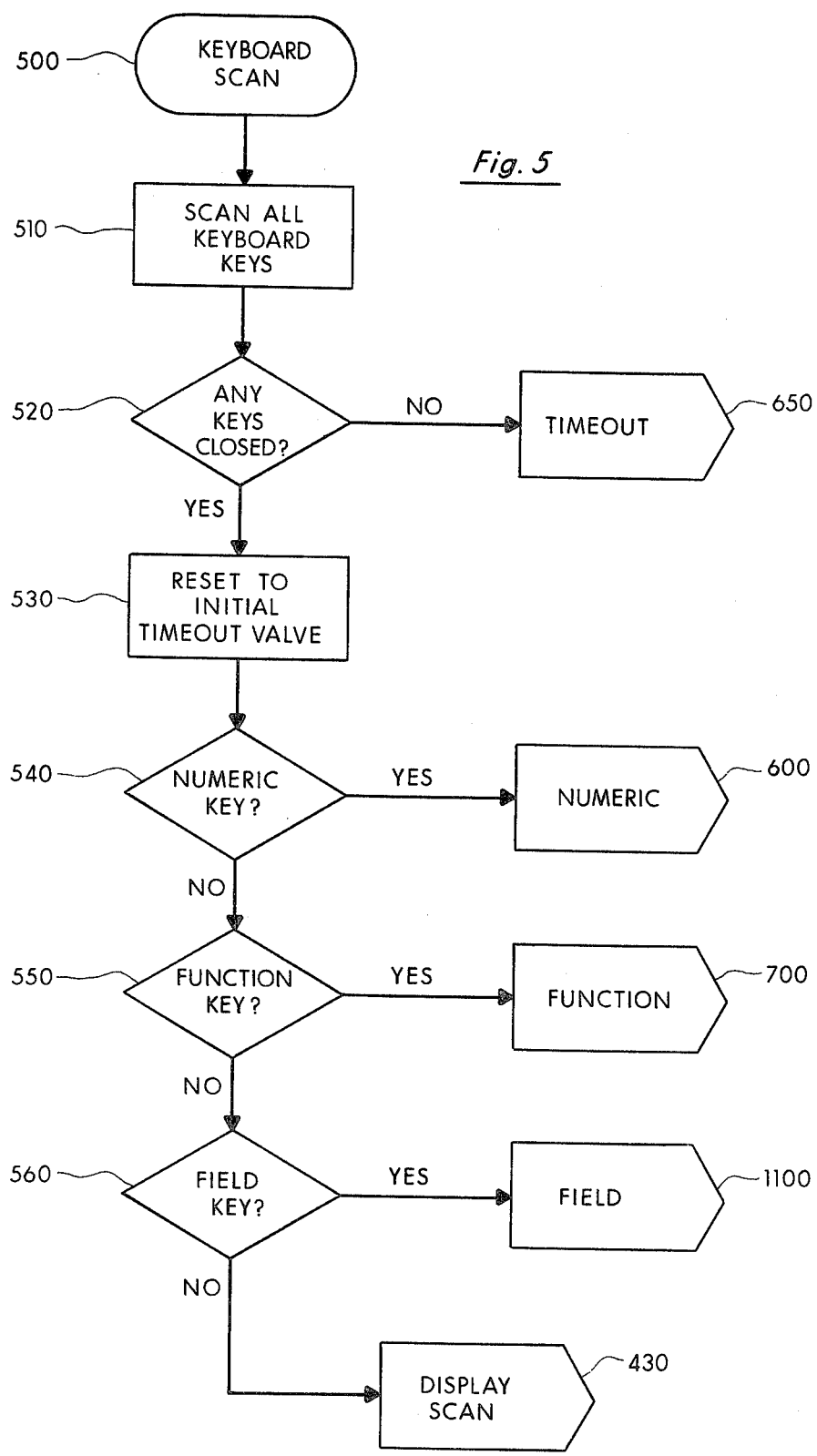
Figure 6:
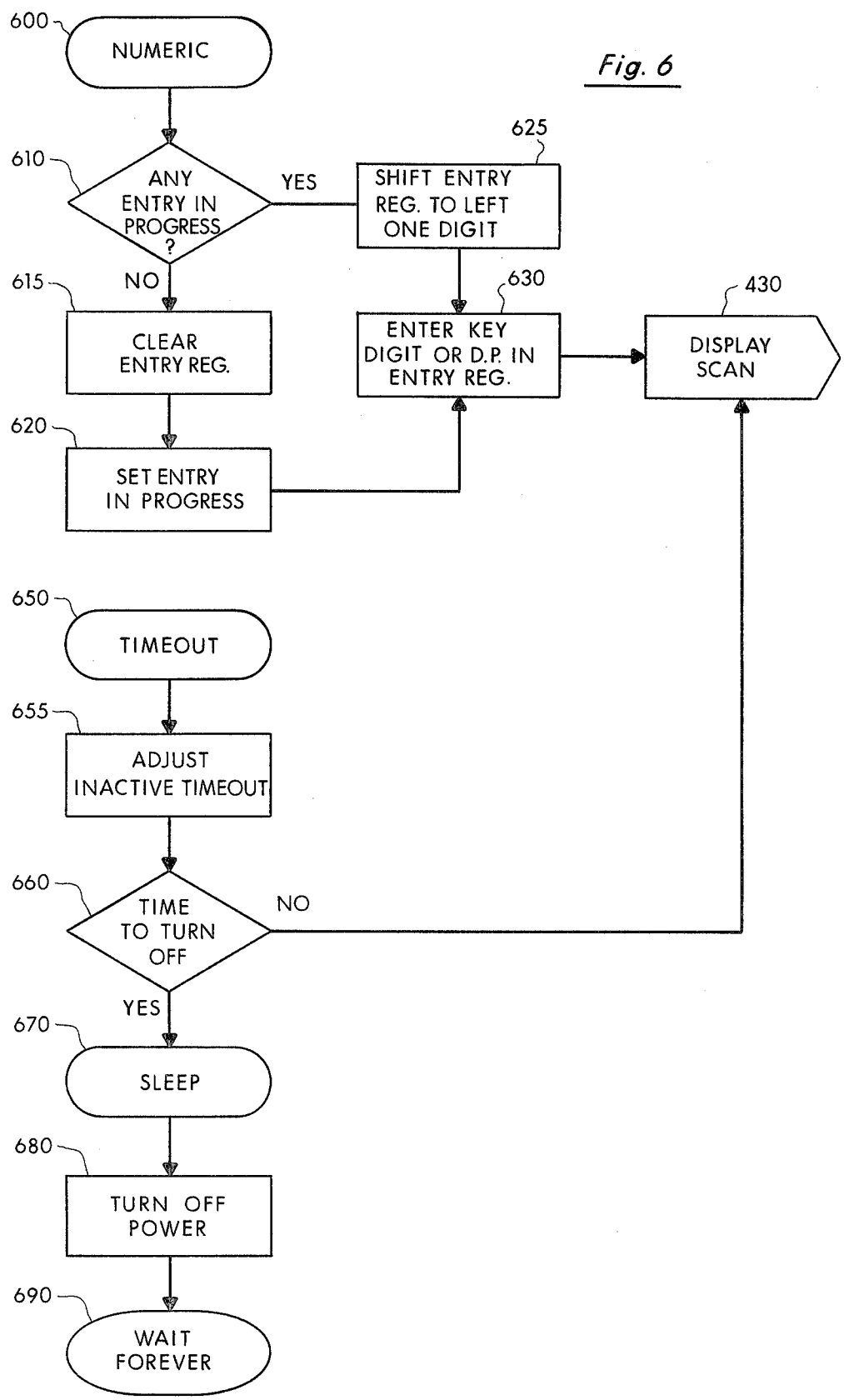

The keyboard scan routine 500 is set forth in FIG. 5. The microprocessor 300 at time 510 scans all of the numerical keys 40, the functional keys 50 and the field keys 60. If no keys are pressed, the microprocessor 300 enters a time out sub-routine 650 as shown in FIG. 6. However, if at time 520, any one of the keys is closed, the microprocessor 300 at time 530 resets a time out 650 to an initial time out value and makes inquiry as to which key was activated. At time 540, the microprocessor 30 scans each key of the numerical keys 40 and if one was pressed, the microprocessor enters the numeric sequence 600 as shown in FIG. 6. However, if no keys of the numerical keys 40 were pressed, the microprocessor at time 550 scans the function keys to ascertain whether or not an individual function key was pressed. If so, the microprocessor 300 enters the function routine 700 as set forth in FIG. 7 and if not, the microprocessor 300 then scans the field keys 60 to ascertain if a field key was pressed at time 560. If so, the microprocessor 300 enters the field routine 1100 as set forth in FIG. 11 and, if not, the microprocessor 300 resumes its display and scan function 430 as set forth in FIG. 4.

In FIG. 6, the numeric routine 600 and the time out routine 650 are set forth. In numeric routine 600, the microprocessor 300 at time 610 decides whether or not a prior entry (numeric) has been made and is in progress. If not, the microprocessor 300 clears the entry register 340 and loads in the value of the numbers selected from the numerical keys 40 at time 620. On the other hand, if an entry has already been in progress, then the microprocessor 300 at time 625 shifts the entry register to the left one digit and at time 630 enters the numerical value from the key or a decimal point value into the entry register 340. At this point in time, the microprocessor 300 will enter into the display scan routine 430 and display the value found in the entry register. For example, if the number 3 had been priorly entered into the display 30, the microprocessor 300 would follow paths 600, 610, 625, 630 and 430 when a new number 7 is entered with the numerical keys 40. The display would then show the number 37. On the other hand, if no number was priorly entered, and the number 7 was pushed in the numerical keys 40, the microprocessor 300 would follow paths 600, 610, 615, 620 and 430.

The time out routine 650, also shown in FIG. 6, is entered when no keys are closed as set forth in FIG. 5 at time 520. The microprocessor 300 at time 655 adjusts the inactive time out. At time 660, the microprocessor 300 determines whether or not a predetermined time has elapsed for turn off. If not, it will continue the display and scan routine 430. If a time out has occurred, the processor will enter a sleep stage 670 and after a predetermined period of time will time out and at that time 680 the power will be turned off. Of course, when the power is turned off, the calculator could conceivably wait forever 690 until the ON button is once again pushed.

Figure 7:
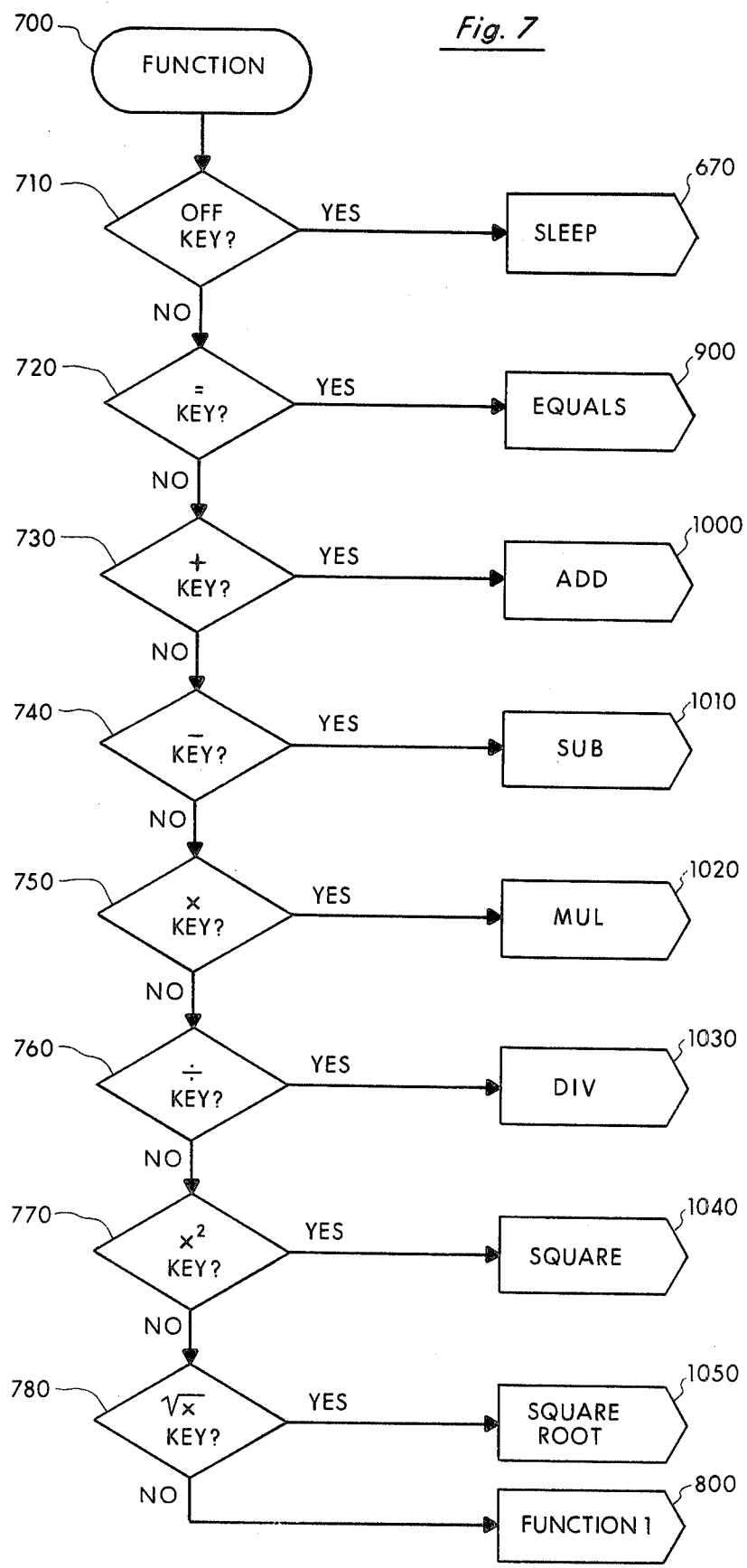

The function routine 700 is illustrated in FIG. 7. As set forth in the discussion of FIG. 5, the microprocessor 300 enters the function routine 700 when a functional keys 50 is pushed at time 550. At that time, the microprocessor 300 enters the function routine 700 and at time 710 ascertains whether or not the OFF key has been pushed. If so, the microprocessor 300 enters the sleep routine 670. In similar fashion, the microprocessor 300 interrogates the status of each of the following keys: the = key at time 720, the + key at time 730, the − key at time 740, the x key at time 750, the ⇌ key at time 760, the $x^2$ key at time 770, and the $\sqrt{}$ x key at time 780. If any of these keys have been activated, the microprocessor 300 will enter the respective sub-routine. If none of these keys are activated, the microprocessor then enters the Function 1 routine 800 as set forth in FIG. 8.

Figure 8:
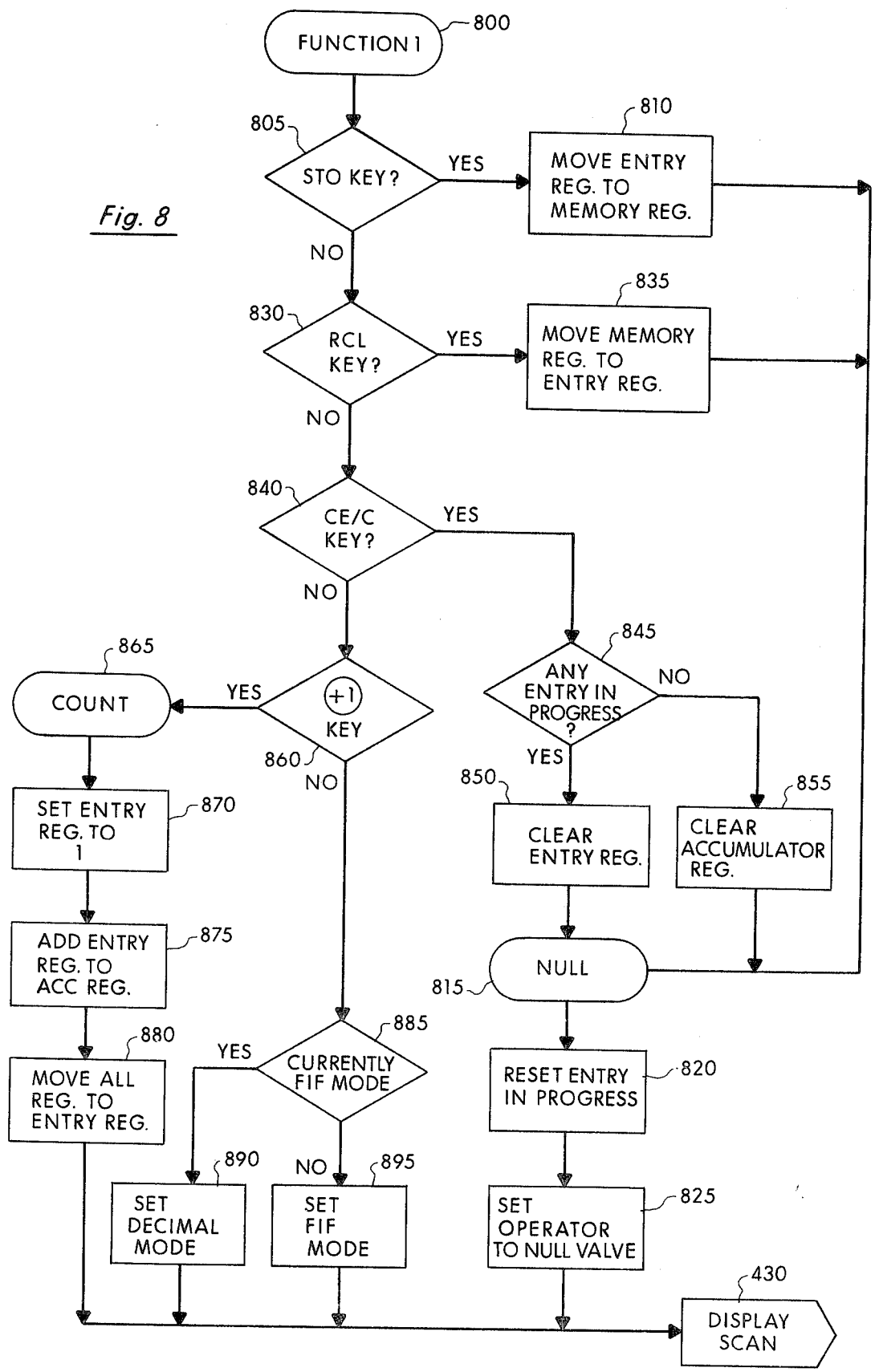

FIG. 8 continues the routine by the microprocessor 300 by interrogating each of the remaining function keys 50. At time 805, the microprocessor 300 interrogates whether or not the memory storage key (STO) has been activated and if so, at time 810 transfers the value stored in the entry register 340 into the memory 320 and thereupon enters a null routine 815 which causes the entry register 340 to be reset to zero at time 820 and at time 825 sets the operator to a null value.

On the other hand, if the memory storage key at time 805 has not been activated, the microprocessor 300 thereupon interrogates the recall from memory key (RCL) at time 830 and if that is activated, the microprocessor 300 at time 835 loads the entry register 340 with the value found in memory 320. Again, the microprocessor 300 enters the null routine 815. On the other hand, if the RCL key has not been activated at time 803, the microprocessor interrogates the status of the clear entry and clear key (CE/C) and if that is activated, the microprocessor 300 at time 845 decides whether or not an entry is in progress. If any entry is in progress, the microprocessor 300 clears the entry register 340 and enters the null routine 815. If no entry is in progress at time 845, the microprocessor 300 clears the accumulator register 330 at time 855 and then enters the null routine 815.

On the other hand, if the clear entry and clear key has not been activated at time 840, the microprocessor 300 will interrogate the status of the +1 key at time 860. If that key has been activated, the microprocessor 300 enters a count sub-routine at time 865 which causes the entry register to be set to the value of 1 at time 870 and then adds the value of 1 in the entry register 340 to the value contained in the accumulator 330. The microprocessor 300 at time 880 enters the increased value from the accumulator register into the entry register 340. On the other hand, if the +1 key has not been activated at time 860, the microprocessor 300 will interrogate the MODE key at time 885. If the MODE key has been activated, the microprocessor 300 will set the DI mode internally at time 890 and if it has not been activated, it will continue in the FIF mode of operation at time 895.

Figure 9:
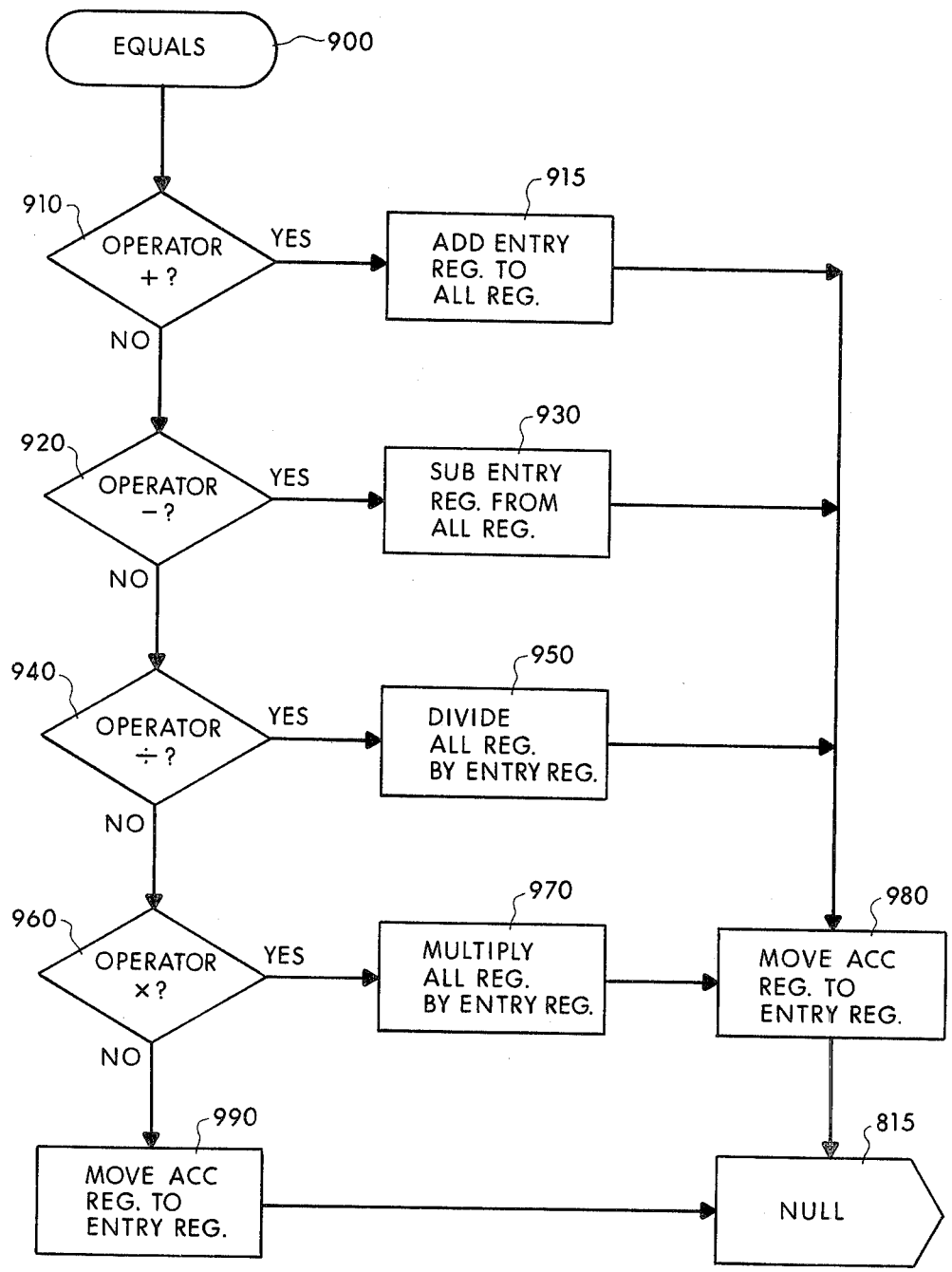

In FIG. 9 the equals sub-routine 900 is found. In this sub-routine, the microprocessor 300 ascertains which arithmetic operator (+, −, ÷, or x) has been authorized. If no operation has been authorized, the microprocessor 300 at time 990 moves the value stored in the accumulator register to the entry register and enters the null routine 815. On the other hand, if any one of the operators at times 910, 920, 940, or 960 have been authorized, the microprocessor 300 will perform the intended arithmetic operational function. For example, if at time 910, the + operator has been authorized, the microprocessor 300 will add the value of the entry register to the value stored in the accumulator register 330 and then move the summation value in the accumulator register back to the entry register 340 and enter the null routine 815.

Figure 10:
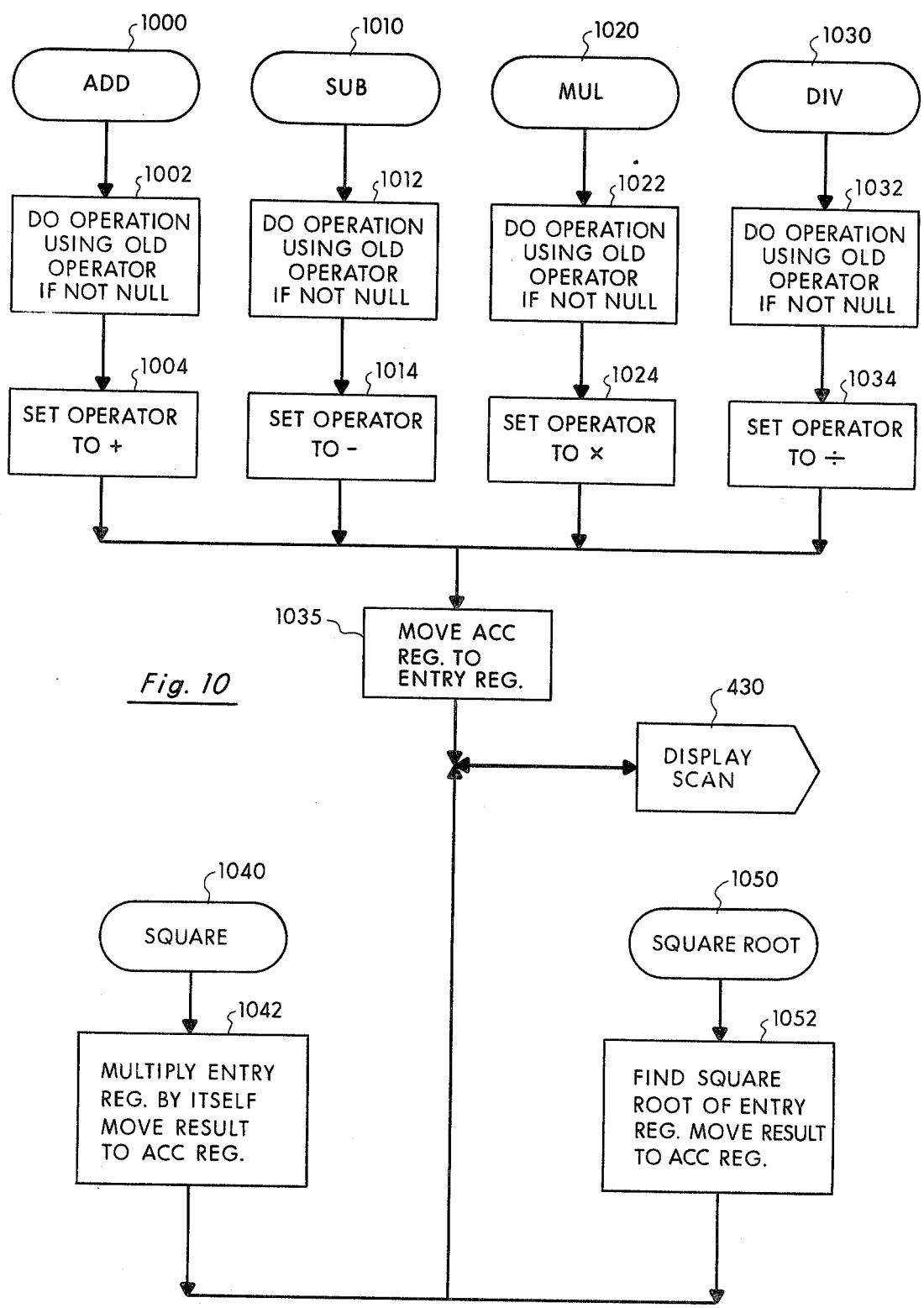

In FIG. 10, the various arithmetic operations are set forth. The sub-routine for each operation 1000, 1010, 1020 and 1030, is explained in FIG. 10. For example, when the addition routine 1000 is entered, the processor 300 performs the current or old operation unless the operator has been set to a null value at time 825. The operator is then set to + at time 1004. The processor 300 then moves the value in the accumulator 330 into the entry register 340 and returns to the display scan routine 430. Routines 1040 and 1050 for the square and square root functions are explained in FIG. 10.

Figure 11:
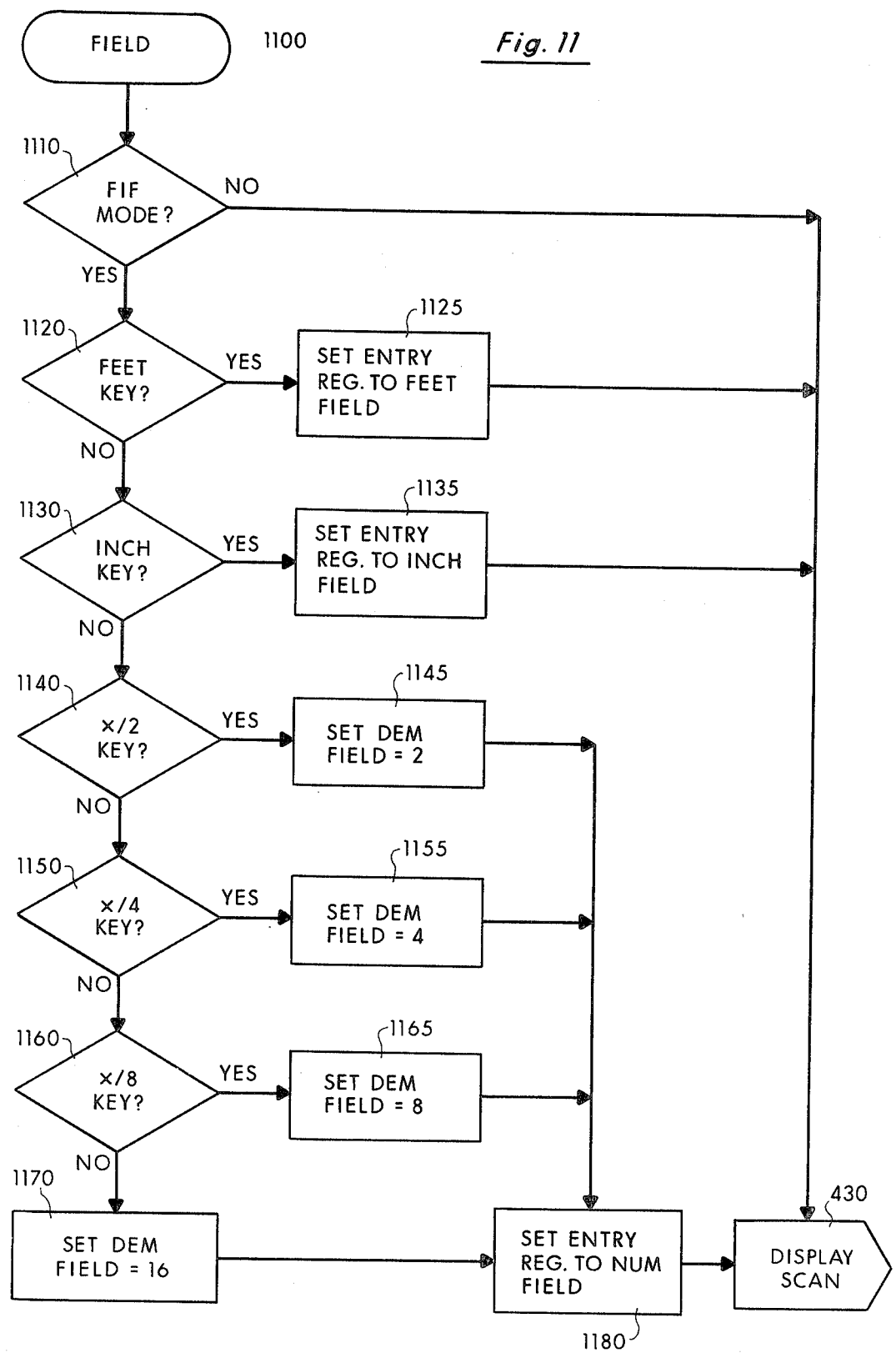

In FIG. 11, the field sub-routine 1100 is set forth in this sub-routine, the microprocessor 300 interrogates the status of each of the input keys in the field keyboard 60. If the microprocessor 30 is not in the FIF mode of operation, it returns to the display scan sub-routine 430. On the other hand, if it is in the FIF mode of operation, the microprocessor 300 at time 1120 ascertains whether or not the feet key (FT) has been activated. If so, the microprocessor at time 1125 sets the entry register 340 to the feet field of operation and returns to the display scan routine 430. If the feet key at time 120 has not been activated, then the microprocessor 300 at time 1130 inquires whether the inch key (IN) has been activated. If so, the entry register 340 at time 1135 is set to the inch field. On the other hand, if the inch key at time 1130 has not been activated, then the microprocessor 300 determines the status of each of the fraction keys at times 1140, 1150, and 1160. If any of these keys are activated, the microprocessor 300 sets the appropriate denominator field (DEM) in the microprocessor 300. It then sets the entry register 340 to the numerator field at time 1180.

In summary, FIGS. 4 through 11 set forth the various routines that the microprocessor 300 goes through to process the data set forth in the numerical keys 40, the functional keys 50, and the field keys 60 in order to receive that data, assimilate it, perform computational calculations on it and display the results in the display 30. Of course, the routines set forth in these figures represent only one embodiment and it is to be expressly understood that other routines could be contrived which would fall under the teachings under the present invention.

D. Other Preferred Embodiments

Figure 12:
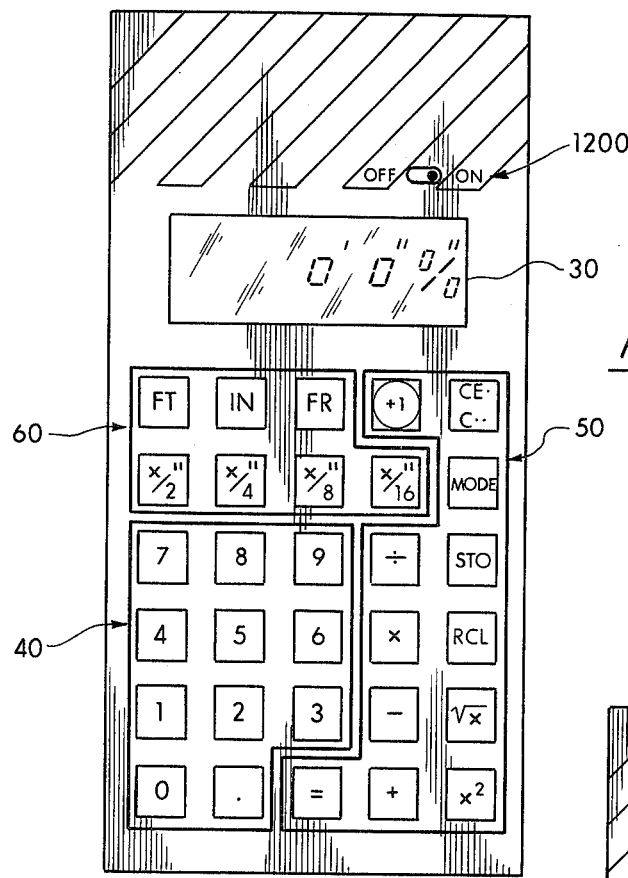

In FIG. 12, a second preferred embodiment of the portable hand-held electronic calculator of the present invention is set forth. In this embodiment, the numerical keys 40 are the same as that of FIG. 2. The functional keys 50 are essentially the same as that of FIG. 2 except that a separate ON/OFF switch 1200 is provided. All other keys in the numerical keys 40 and the functional keys 50 are the same.

However, the field keys 60 have been modified to include an additional button for fractions (FR). The addition of this button necessitated the positioning of the separate ON/OFF button 1200. All other keys in the field keys 60 are the same. This preferred embodiment, as shown in FIG. 12, has greater flexibility in that the feet values, the inch values, and the fractional values, can be inputted in any order. The earlier example of entering 13'-3 3/16" will be used in the following table:

| Sequence | Location | Display | Flashing Portion of Display |
|---|---|---|---|
| Press ON | Switch 1200 | 0' 0" | |
| Press FT | Keys 60 | 0' | 0' |
| Press 1 | Keys 40 | 1' | 1' |
| Press 3 | Keys 40 | 13' | 13' |
| Press FR | Keys 60 | 13' 0 0/0" | 0/0" |
| Press 3 | Keys 40 | 13' 0 3/0" | 3/0" |
| Press x/16 | Keys 60 | 13' 0 3/16" | — |
| Press IN | Keys 60 | 13' 0 3/16" | 0 |
| Press 3 | Keys 40 | 13' 3 3/16" | 3 |
| Press Any Function Key 50 | | 13' 3 3/16" | — |

Additional flexibility results in that the data can be entered into in any fashion. This flexibility has been traded off for two extra steps over the embodiment shown in FIG. 2. Also, it is clear that at any step, in this embodiment, the clear entry button could be pushed to clear the entry for only one portion of the overall data whereas if a mistake were to occur in the embodiment shown in FIG. 2, the entire value would have to be erased and be fully reentered. Furthermore, this embodiment FIG. 12 is interactive with the user in that when one of the keys FT, IN, or FR is pushed, the associated indicator can be made to flash on and off by the microprocessor 300. Hence, when the user of the embodiment shown in FIG. 12 presses key FT, the foot indicator flashes on and off to indicate to the user to press in the values for feet. At any point in an entry, the user will know what portion of the number being entered has not been entered.

Figure 13:
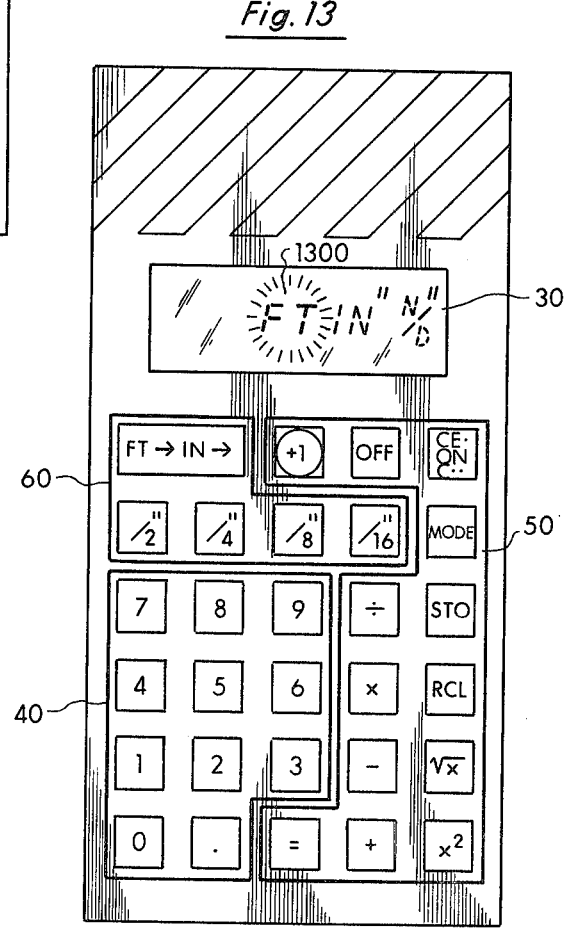
FIG. 13 is a top planar view of the calculator of FIG. 1 in a third embodiment, FIG. 14 details the display segments and indicators of the present invention.

In FIG. 13, yet a third embodiment of the present invention is set forth. In this embodiment, the numerical and functional keys 40 and 50 are identical to that of FIG. 2. However, the field keys 60 include only one button commonly labeled feet and inches with arrow indicators, like those shown in FIG. 13 associated therewith. This preferred embodiment operates as follows:

| Sequence | Location | Display | Flashing Portion of Display |
|---|---|---|---|
| Push ON | Keys 50 | FT IN N/D | FT |
| Push 1 | Keys 40 | 1' IN N/D | 1' |
| Push 3 | Keys 40 | 13' IN N/D | 13' |
| Push FT-IN | Keys 60 | 13' IN N/D | IN |
| Push 3 | Keys 40 | 13' 3" N/D | 3" |
| Push FT-IN | Keys 60 | 13' 3" N/D | N |
| Push 3 3/D" | Keys 40 | 13'3" | 3* |
| Push /16 | Keys 60 | 13' 3 3/16" | — |

*Located in fractions of inch display

The advantage provided by the embodiment shown in FIG. 13 is that it is an interactive, as shown at 1300, and natural application of the present invention. The calculator of FIG. 13 forces the user to enter on an interactive basis through flashing of the appropriate symbols the intended value to be inputted into the calculator. Again, this approach takes only six steps as did the approach shown in FIG. 2.

E. Display

Figure 14:
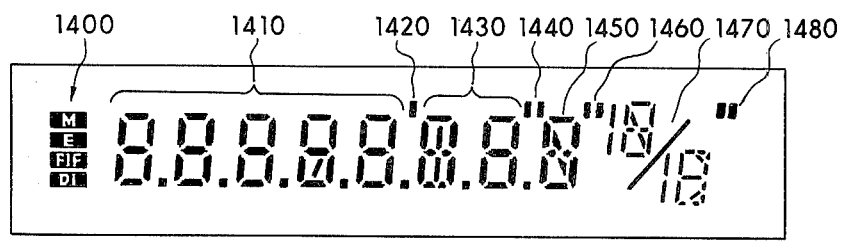

The configuration of the display is shown in FIG. 14. At the left of the display, a series of indicators 1400 are placed:
(a) M for Memory,
(b) E for Error,
(c) FIF for Feet-Inch-Fraction Mode of operation, and
(d) DI for Decimal Inch Mode of operation.

Figure 15:
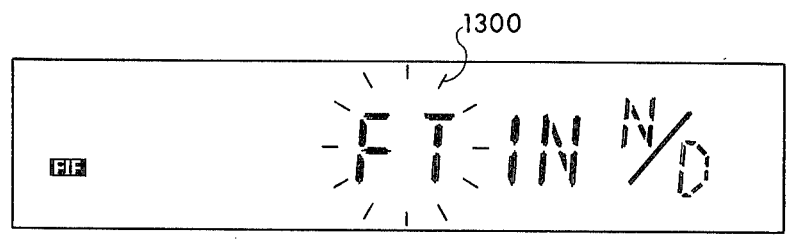
FIG. 15 illustrates the display of FIG. 14 in an interactive mode.
Figure 16:
FIG. 16 illustrates the display of FIG. 14 showing an input.

In operation, and as shown in FIGS. 15 and 16, the FIF indicator will become visibly activated when the calculator is in that mode. The remaining display contains five digits 1410 and are provided to the left of the FT indicator 1420, two digits 1430 are provided to the left of the first IN indicator 1440 and one digit 1450 is provided to the left of the second IN indicator 1460. Finally, a fraction display 1470 is provided to the left of the third IN indicator 1480. In FIG. 15, the FT, IN, N/D interactive signals, for the third embodiment of the present invention, are shown with the FT signal flashing 1300 on and off. In FIG. 16, the values 85'-10 13/16" are shown displayed.

The present invention has been shown with a degree of particularity in a preferred embodiment with two alternate embodiments setting forth alternate field keyboard configurations and alternate displays. It is to be expressly understood that change in the structure presented herein can be made without departing from the spirit of the present invention as set forth in the following claims.

We claim:

1. A portable hand-held electronic calculator for feet, inch, and fraction calculations, said calculator having a housing containing a display, numerical keys, functional keys, and means operatively connected to said numerical and functional keys for performing a plurality of predetermined computations based upon which keys are pressed, said performing means being operatively connected to said display for displaying the results of said computations, said calculator comprising:
   field keys interconnected with said performing means, said field keys comprising each of the following input keys:
   (a) a feet input key,
   (b) an inch input key,
   (c) a plurality of fraction input keys of a predetermind series of fractions where the numerator is preselected from said numerical keys, each of said input keys being capable of selective manual activation,
   means in said display for indicating feet, inches, and fractions, and
   means in said performing means receptive of a number from said numerical keys and then responsive to the selective manual activation of any one of said input keys in said field keys for displaying the aforesaid number in the selected feet, inches, or fractions in said display with said indications, said performing means being further capable of determining said computations of feet, inches, and fractions.

2. The electronic calculator of claim 1 wherein said indicating means comprises each of the following visual patterns in said display:
   (number)',
   (number)", and
   (number)/($2^n$)"
where the value of, the (number) is selected from said numerical keys and the value of ($2^n$) is selected from one of said fraction input keys in said field keys.

3. The electronic calculator of claim 1 further comprising:
   a mode key in said field keys, said mode key being operatively interconnected with said performing means, said performing means being responsive to the activation of said mode key for conversion between values expressed in a decimal inch format and values expressed in a feet-inch-fraction format, and said display being capable of indicating decimal inches.

4. A portable hand-held electronic calculator for feet, inch, and fraction calculations, said calculator having a housing containing a display, numerical keys, functional keys, and means operatively connected to said numerical and functional keys for performing a plurality of predetermined computations based upon which keys are pressed in the aforesaid keys, said performing means being operatively connected to said display for displaying the results of said computations, said calculator comprising:

field keys interconnected with said performing means, said field keys comprising each of the following input keys:
(a) a feet input key,
(b) an inch input key, and
(c) a plurality of fraction input keys of the series $x/2, x/4, x/8, x/16, \ldots, x/2^n$, where n is an integer and where x is preselected from said numerical keys, each of said input keys being capable of selective manual activation.

5. The electronic calculator of claim 4 further comprising:
a mode key in said field keys, said mode key being operatively interconnected with said performing means, said performing means being responsive to the activation of said mode key for conversion between values expressed in a decimal inch format and values expressed in a feet-inch-fraction format.

6. A portable hand-held electronic calculator for feet, inch, and fraction calculations, said calculator having a housing containing a display, numerical keys, functional keys, and means operatively connected to said numerical and functional keys for performing a plurality of predetermined computations based upon which aforesaid keys are pressed, said performing means being operatively connected to said display for displaying the results of said computations, said calculator comprising:
field keys interconnected with said performing means, said field keys comprising each of the following input keys:
(a) a feet input key,
(b) an inch input key,
(c) a plurality of fraction input keys of the series $x/2, x/4, x/8, x/16, \ldots, x/2^n$, where n is an integer and where x is preselected from said numerical keys, each of said input keys being capable of selective manual activation,
(d) a mode input key,
means in said display for visually indicating each of the following:
(number)',
(number)", and
(number)/$(2^n)$"
where the value of the (number) is selected from said numerical keys and the value of $(2^n)$ is selected from one of said fraction input keys in said field keys, and
means in said performing means receptive of a number from said numerical keys and then responsive to said selective manual activation of any one of said input keys in said field keys for displaying the aforesaid number in feet, inches, or fractions in said display with said indications, said performing means being further capable of determining said computations in feet, inches, and fractions, said mode key being operatively interconnected with said performing means, said performing means being responsive to the activation of said mode key for conversion between values expressed in a decimal inch format and values expressed in a feet-inch-fraction format.

7. A portable hand-held electronic calculator for feet, inch, and fraction calculations, said calculator having a housing containing a display, numerical keys, functional keys, and means operatively connected to said numerical and functional keys for performing a plurality of predetermined computations based upon which keys are pressed in the aforesaid keys, said performing means being operatively connected to said display for displaying the results of said computations, said calculator comprising:
a plurality of fraction input keys of the series $x/2, x/4, x/8, x/16, \ldots x/2^n$, where n is an integer and where x is preselected from said numerical keys,
means for manually inputting field information in the form of feet, inches, and fractions in response to te selective activation of said numerical keys and of said fraction input keys,
means in said display for indicating feet, inches, and fractions, and
means in said performing means receptive of a number from said numerical keys and said fraction input keys and then being responsive to said field information from said inputting means for displaying the aforesaid number in feet, inches, or fractions in said display with said indications, said performing means being further capable of determining said computations in feet, inches, and fractions.

8. The portable hand-held electronic calculator of claim 7 wherein said display comprises in order from the left side of the display:
a first series of display units for visually showing numerals,
a feet indicator,
a second series of two display units for visually showing numerals,
a first inch indicator,
a third display unit for visually showing a numeric,
a second inch indicator,
a fourth display unit for visually showing the numerator and denominator of a fraction,
a third inch indicator, and
said last unit of said first series of display units being capable of displaying F, said first unit of said second series of display units being capable of displaying T, said second unit of said second series being capable of displaying I, said third display unit being capable of displaying N, and said fourth display unit being capable of displaying N/D.

9. A display for an electronic calculator for feet, inch, and fraction calculations having, in order from the left side of the display:
a first series of display units for visually showing numerals,
a feet indicator,
a second series of two display units for visually showing numerals,
a first inch indicator,
a third display unit for visually showing a numeric,
a second inch indicator,
a fourth display unit for visually showing the numerator and denominator of a fraction,
a third inch indicator, and
said last unit of said first series of display units being capable of displaying F, said first unit of said second series of display units being capable of displaying T, said second unit of said second series being capable of displaying I, said third display unit being capable of displaying N, and said fourth display unit being capable of displaying N/D.

* * * * *